United States Patent [19]

Stahura

[11] 4,098,394
[45] Jul. 4, 1978

[54] RATCHET TENSIONER FOR BELT CLEANERS

[75] Inventor: Richard Stahura, Indiana, Pa.

[73] Assignee: Martin Engineering Company, Neponset, Ill.

[21] Appl. No.: 743,769

[22] Filed: Nov. 22, 1976

[51] Int. Cl.² ............................................. B65G 45/00
[52] U.S. Cl. .................................................. 198/499
[58] Field of Search ................ 198/497, 499, 860, 861

[56] References Cited

U.S. PATENT DOCUMENTS

| 1,792,501 | 2/1931 | Manierre | 198/499 |
| 2,168,622 | 8/1939 | Levin | 198/497 |
| 2,850,146 | 9/1958 | Madeira | 198/813 |
| 3,342,312 | 9/1967 | Reiter | 198/499 |
| 3,598,231 | 8/1971 | Matson | 198/499 |
| 3,631,968 | 1/1972 | Ward | 198/499 |
| 3,994,384 | 11/1976 | Reiter | 198/497 |

Primary Examiner—Bruce H. Stoner, Jr.
Assistant Examiner—Richard K. Thomson
Attorney, Agent, or Firm—McWilliams & Mann

[57] ABSTRACT

A mounting and support arrangement for conveyor belt cleaners which provides for selective incremental rotation of a cross-shaft on which is carried a plurality of belt cleaner blades suspended from mounting arms. A radial ratchet and pawl arrangement is provided exterior to the housing of the conveyor belt to be cleaned which provides for rotation of the shaft to bias the cleaner blades against the belt until the desired blade pressure is attained. A locking pawl secures the shaft against counter-rotation.

2 Claims, 4 Drawing Figures

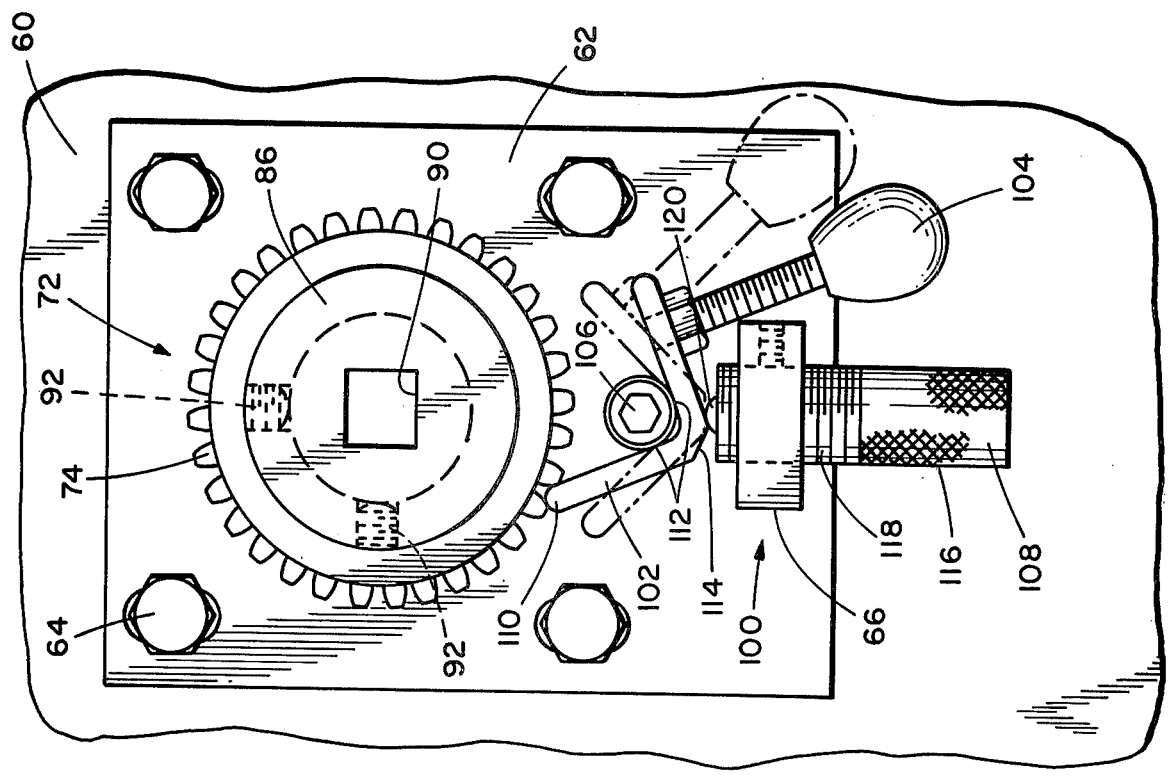
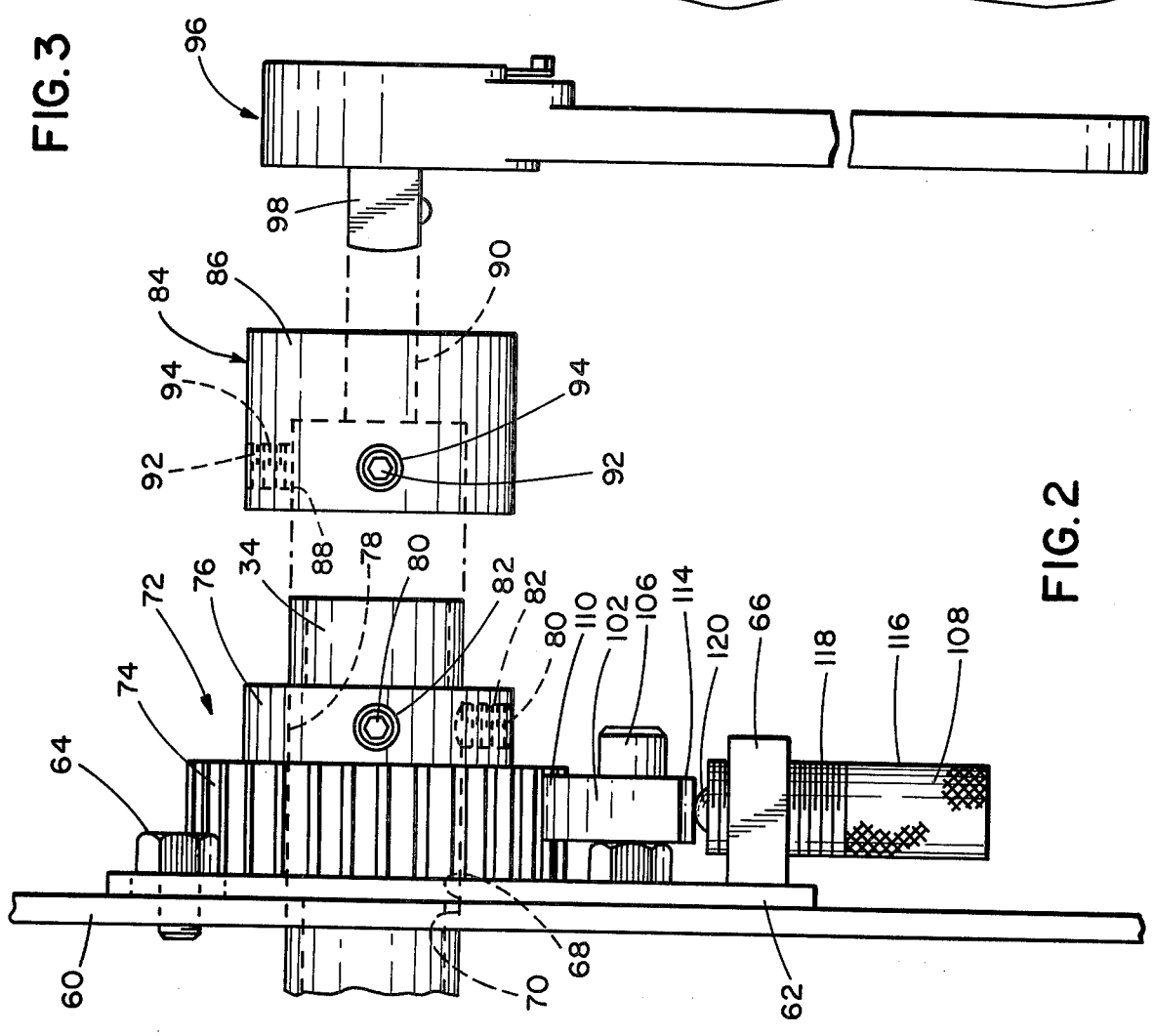

4,098,394

RATCHET TENSIONER FOR BELT CLEANERS

BACKGROUND OF THE INVENTION

It has been known in the prior art to provide a mounting arrangement for conveyor belt cleaners whereby the cross-shaft on which the belt cleaners are mounted was adapted to be rotated to one of a number of preselected orientations. This was accomplished by movement of a lever arm connected to the cross-shaft and the subsequent locking of the arm and shaft against further rotation. Such an arrangement, although operative to achieve the desired result, has certain drawbacks which prevent it from being as effective as it should be. It must be recognized that in the majority of conveyor belt installations space and access are at a premium. The prior art arrangement required the operator to exert substantial torque, sometime in excess of 200 foot-pounds, in an area which is generally cluttered. This often makes it difficult for the operator to be able to grasp the handle in a position that would permit him to have the leverage to exert this kind of force. Such an arrangement also presents a problem as to where the assembly can be mounted so as to minimize interference with the access door provided in the conveyor housing. To be able to open the access door and frequently inspect the cleaner is important to insure continuous operation of the belt cleaner.

SUMMARY OF THE INVENTION

The present invention provides a radial ratchet arrangement for incremental rotation of the cross-shaft which supports the belt cleaner blades. As a result of the radial ratchet arrangement provided the overall torque required to change the belt cleaner blade tension is reduced and the ratchet arrangement allows the ratchet handle to be positioned at any convenient angle for rotation. The present invention includes a spur gear connected to the cross-shaft external to the conveyor belt housing and a locking pawl associated with the spur gear which, in its lock position, permits rotation of the spur gear and cross-shaft in only one direction. This arrangement provides for easy removal of the entire cross-shaft assembly when repair or replacement of the cleaner blades is required.

DESCRIPTION OF THE DRAWINGS

FIG. 2 is a sectional view taken substantially on the line 2—2 of FIG. 1.

FIG. 3 is a side view of the ratchet arrangement shown in FIG. 2 with the wrench removed.

DESCRIPTION OF THE PREFERRED EMBODIMENT

Figure 1:
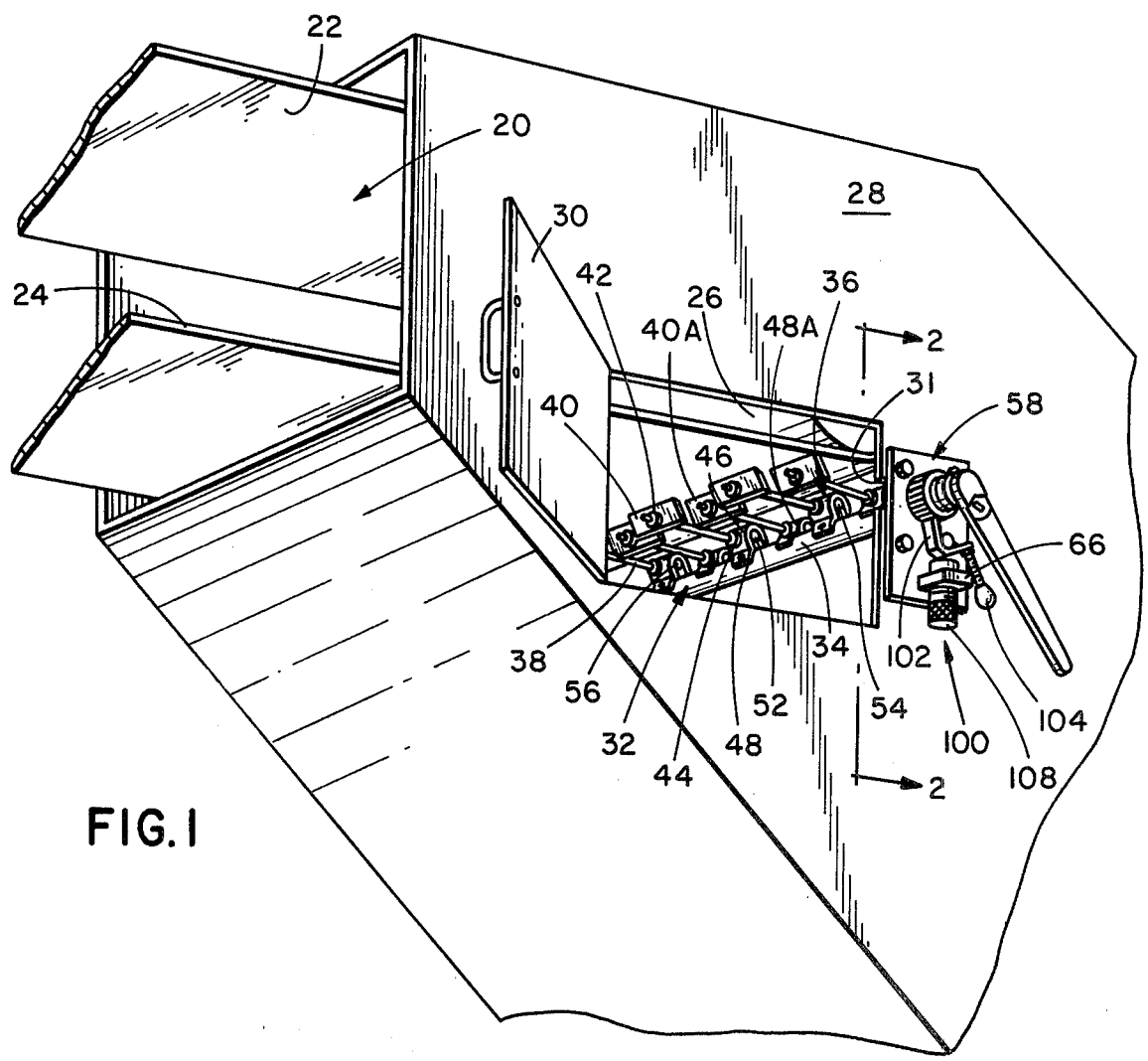
FIG. 1 is a fragmentary perspective view of the belt conveyor and cleaning and mounting arrangement of the present invention.

FIG. 1 shows, in perspective, the discharge end portion of a conveyor belt 20 here selected as representative of typical conveyors, having an upper or delivery run 22 and a lower or return run 24, the belt being trained as usual about a drum or roller 26 conventionally carried in a frame (not shown) within a housing 28. The housing is provided with an access door 30 which allows the operator to inspect the belt cleaning operation. Frequent inspection is important to insure continuous operation of the belt cleaner. Adjacent the access door a slot 31 is formed in the housing 28 the purpose for which will be described later.

A belt cleaner assembly 32 is provided consisting of a cross-shaft 34 which is disposed below and substantially transverse to the direction of travel of the return run 24 as indicated by the arrow. Carried on the shaft 34 is a plurality of mounting means 36, each of which is designed to support a rodlike member or arm 38 to which is affixed a blade 40. The mounting of the blade may be effected by a pair of nuts 42 or by any of a number of commonly accepted mounting methods. It is to be understood that any of a variety of arrangements may be substituted for mounting the blade 40 to the arm 38 or for mounting the arm 38 to the shaft 34 without affecting the scope of the present invention. In the embodiment illustrated a torsion mount is provided between the arm 38 and the shaft 34. The arm 38 is threaded into a nut 44 which is welded or otherwise rigidly attached to a sleeve-like portion or tubular part 46. A U-shaped bracket 48 is rigidly affixed to the cross-shaft 34 by means of a bolt 50 or some other suitable fastening. The bracket 48 includes a pair of ears 52 extending radially from the shaft and a fastener 54 here illustrated as a nut and bolt extending therebetween parallel to the axis of the cross-shaft 34. An annular elastomeric member 56 is disposed between the fastener 54 and the inner periphery of the tubular part 46 to elastically resist twisting and deflection of the arms relative to the shaft. The spring action from the torsion mount withstands the impacts from high speed belts and still keeps the blades in proper position. It is to be noted that adjacent pairs of brackets 48 and 48A are radially staggered with respect to each other to provide for a slight overlap between the adjacent blades 40 and 40A.

A radial ratchet tensioning arrangement 58 is illustrated for incrementally rotating the shaft 34 to bias the cleaner blades 40 against the bottom surface of the lower run 24 to thereby effect a scraping and cleaning operation for removing excess material from the conveyor belt.

As best shown in FIG. 2 the shaft 34 extends through a portion of one side wall 60 of the conveyor housing 28. Arbitrarily we will designate this side of the conveyor housing the "operator" side although the mounting arrangement can be reversed if, due to the location of the housing or surrounding environment, better access is provided on the other side.

As best shown in FIGS. 2 and 3 a first mounting flange 62 is positioned adjacent the wall 60 and is secured thereto by a plurality of bolts 64 or other suitable removable fasteners. Welded to the mounting flange is a threaded collar 66 extending therefrom. The flange 62 defines an aperture 68 therein through which the shaft 34 extends. A similar aperture 70 is defined in the wall 60 for the same purpose.

A rotary gear element 72 is illustrated including a spur gear 74 and a hub member 76 axially extending therefrom. The gear element 72 defines a circular opening 78 extending entirely therethrough and through which the shaft 34 is slidably received. The spur gear and hub are illustrated as a unitary member but may be provided as separate elements if so desired.

A pair of set screws 80 are received within a pair of threaded bores 82 radially disposed in the hub member 76. The set screws are adapted to engage the shaft 34 and prevent relative movement, either rotational or axial, between the shaft and the rotary element.

A coupling 84 is illustrated which is adapted to transfer torque from a torque applying member to the shaft 34. The coupling 84 includes a housing 86 defining an annular internal wall 88 and further defining a square shaped axially extending opening 90 in the outward end thereof. The internal wall 88 is designed to slide over the end of the shaft 34. A pair of set screws 92 are shown positioned within a pair of threaded bores 94 radially disposed in the housing 86. The set screws are adapted to engage the shaft 34 and prevent relative movement either rotational or axial between the coupling 84 and the shaft 34.

A torque applying member 96 is illustrated in the form of a standard, reversible ratchet wrench. The wrench 96 has an outwardly extending square head projection 98 adapted to be received within the opening 90 for transmitting torque to the coupling 84 and therethrough to the shaft 34. It should be apparent that torque could also be transmitted to the shaft by means of a coupling which, instead of utilizing a square internal opening as 90, provides a square shaped, axially extending male projection which can be inserted into a ratchet wrench which has a square head female opening formed in its face.

As best illustrated in FIG. 3 a locking pawl mechanism 100 is provided which, when in one position, will allow one way rotation of the spur gear 74. The mechanism includes an L shaped locking pawl 102 with a handle 104 extending therefrom, a pivot post 106 affixed to the mounting plate 62 and a spring loaded lock member 108 cooperative with the locking pawl 102.

The pawl 102 includes a finger-like end 110 which is adapted to interfit between adjacent teeth of the spur gear 74. Both side walls 112 of the included angle of the pawl 102 are adapted to contact and pivotally rock about the pivot post 106. A flat face 114 is formed on the outer periphery of the pawl 102 where the outer walls are joined.

The lock member 108 includes a hollow cylinder 116 threaded at one end 118 and adapted to be threaded into the collar 66. A ball type detent 120 is spring biased into engagement with the pawl 102. When the pawl 102 assumes the full line position shown in FIG. 3 rotation of the spur gear 74 is permitted only in the clock-wise direction. Any counterclockwise rotation is prevented as can be readily seen. When the cylinder 118 is unscrewed to a position allowing the pawl 102 to assume the dotted line position shown in FIG. 2, the detent 120 engages the flat face 114. The end 110 is held away from engagement with the teeth of the spur gear 74 and free rotation of the gear 74 and shaft 34 is permitted.

Figure 4:
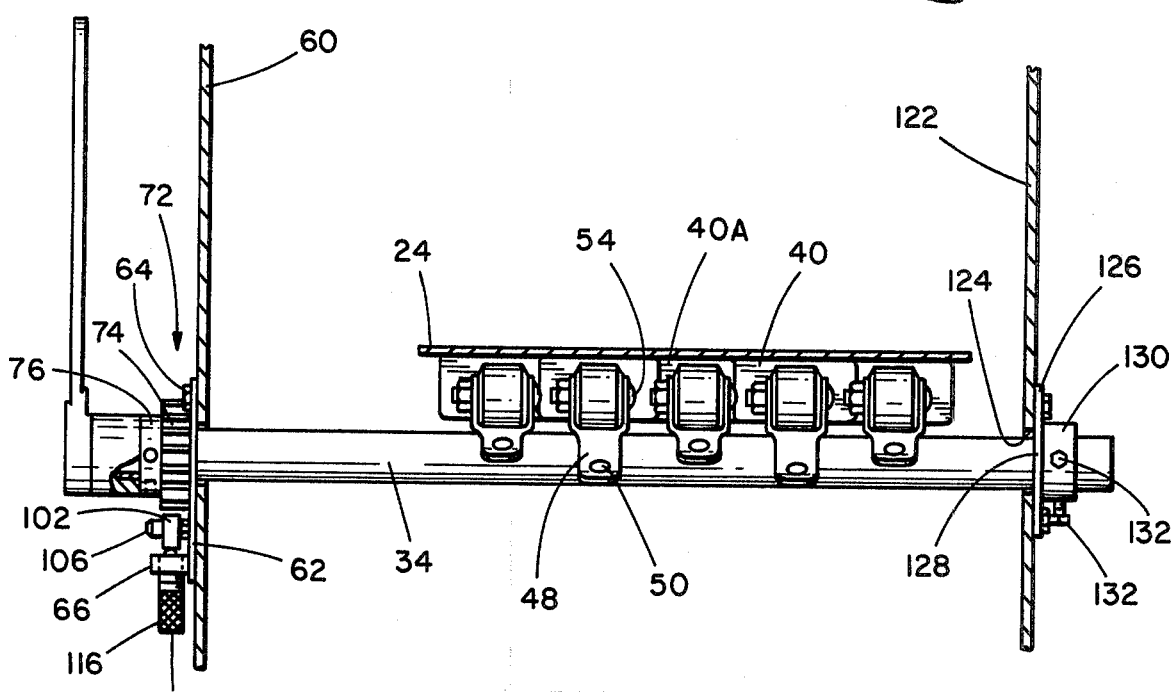
FIG. 4 is a fragmentary end view of a portion of the belt conveyor and mounting arrangement taken from the delivery end.

The arrangement for mounting the shaft 34 on the side away from the operator is best illustrated in FIG. 4. A side wall 122 of the conveyor housing 28 is provided with an opening 124 through which the shaft 34 extends. A mounting flange 126 is shown positioned adjacent the sidewall 122 and removably secured thereto. The mounting flange also includes an opening 128 through which the shaft 34 extends. An annular collar 130 is slidably positioned along the shaft 34 until it abuts the mounting flange 126. A pair of set screws 132 are threaded into the collar and are tightened until they grippingly engage the shaft 34 to prevent axial movement of the shaft with respect to the sidewall 122.

The operation of the present invention is substantially as follows. Under normal circumstances, the mounting flange 126 on the side of the conveyor housing opposite from the operator side is left affixed to the side wall 122 and is not removed. When the belt cleaner assembly 32 is to be mounted the shaft 34 is inserted through the access door 30. The end of the shaft 34 is inserted through the opening 124 in the side wall 122 and through the opening 128 in the mounting flange 126. The collar 120 is then slid over the end of the shaft 34 and set screws 132 are tightened to secure the collar to the shaft. The other end of the shaft 34 is positioned within the groove 31 formed in the "operator" side of the housing and the mounting flange 62 is slid over the end of the shaft 34 and secured to the side wall 60 of the conveyor housing by means of the bolts 64. The rotary gear element 72 is then slid over the end of the shaft until it abuts the mounting flange 62. The set screws 80 are then tightened to grippingly engage the shaft 34 thereby preventing relative movement between the gear element and the shaft. Next the coupling 84 is positioned over the end of the shaft 34 and the set screws 92 are tightened to grip the shaft. The projection 98 of the radial ratchet wrench 96 is then inserted into the opening 90 of the coupling 84. The handle of the ratchet is then rotated in a clockwise direction thereby rotating the shaft 34 and the mounting assembly carried by the shaft. As illustrated in FIG. 3, when the locking pawl mechanism is in the lock position, as illustrated by the full lines in FIG. 3, the rotary gear element 72 is permitted to rotate in a clockwise direction only. Rotation in the counterclockwise direction is prevented by means of the locking mechanism 100.

The operator continues to rotate the handle of the ratchet wrench 96 until the belt scraper blades have engaged the lower portion of the return run 24. Additional rotation of the shaft by the ratchet wrench will increase the tension on the arm members 38 until the desired tension has been achieved. As can be seen the shaft may be rotated in small increments to increase this tension.

When the operator determines that the belt cleaner blades should be repaired or replaced the procedure for removal of the cross-shaft 34 and the belt cleaner assembly 32 is reversed. The wrench 96 is removed, the coupling 84 is slid off the end of the shaft, the rotary gear element 72 is removed from the shaft, the collar 130 is removed from the other end of the shaft, the mounting flange 62 is disassembled from the side wall 60 and the shaft and cleaner assembly is removed from the conveyor housing 28 by means of the access door 30. At this time all or some of the individual wiper blades may be removed and replaced.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. An adjustable mounting arrangement for conveyor belt cleaners including a shaft positioned transverse to the direction of travel of the belt to be cleaned; mounting means associated with said shaft adapted to carry a plurality of belt cleaner blades; a pair of mounting plates each defining an aperture through which said shaft extends, each of said mounting plates adapted to be secured on an opposite side of a housing for said conveyor belt and to rotatably support said shaft; a pawl mechanism associated with said shaft for providing selective incremental rotation of said shaft including a ratchet handle connectible to said shaft and positionable at any point on a 360° radius about the central axis of said shaft; a rotary gear element rotatably connected to said shaft, a coupling rotatable with said shaft adapted to provide a connection between said handle and said shaft for transmission of torque to said shaft, said pawl mechanism having at least one end thereof biased into engagement with said rotary gear element, and a lock member fixed on one of said mounting plates including a spring biased detent in engagement with the pawl to provide one way locking means associated with said shaft selectively operable to prevent rotation of said shaft in one direction.

2. An adjustable mounting arrangement as in claim 1 in which said coupling means includes a housing defining a radial internal flange mounted on said shaft and connected for rotation therewith.

* * * * *